(12) United States Patent
Gao (10) Patent No.: US 12,132,526 B2
(45) Date of Patent: Oct. 29, 2024

(54) RADIO FREQUENCY LOSS BASED SENSOR MANAGEMENT

(71) Applicant: Building Robotics, Inc., Oakland, CA (US)

(72) Inventor: Jun Gao, Saratoga, CA (US)

(73) Assignee: Building Robotics, Inc., Santa Clara, CA (US)

( * ) Notice: Subject to any disclaimer, the term of this patent is extended or adjusted under 35 U.S.C. 154(b) by 265 days.

(21) Appl. No.: 17/822,565

(22) Filed: Aug. 26, 2022

(65) Prior Publication Data

US 2024/0072913 A1 Feb. 29, 2024

(51) Int. Cl.
*H04B 17/309* (2015.01)
*H04B 17/391* (2015.01)
*H04W 48/12* (2009.01)

(52) U.S. Cl.
CPC ......... *H04B 17/309* (2015.01); *H04B 17/391* (2015.01); *H04W 48/12* (2013.01)

(58) Field of Classification Search
CPC ... H04B 19/309; H04B 17/319; H04W 48/12; H04W 4/029; H04W 4/33; H01Q 1/24; H01Q 1/243
See application file for complete search history.

(56) References Cited

U.S. PATENT DOCUMENTS

| | | | | |
|---|---|---|---|---|
| 8,260,210 B2* | 9/2012 | Esteve Asensio | ... | H04B 17/318 365/158 |
| 10,605,890 B1* | 3/2020 | Yun | ...................... | H04W 16/18 |
| 10,694,578 B2* | 6/2020 | Radulescu | ............ | H04W 36/08 |
| 10,791,425 B2 | 9/2020 | Keal et al. | | |
| 11,006,237 B2* | 5/2021 | Krzych | ................. | G01S 5/0295 |
| 11,162,848 B2 | 11/2021 | Gao et al. | | |
| 11,259,389 B1* | 2/2022 | Camden | ............... | H05B 47/155 |
| 11,503,433 B2* | 11/2022 | Mohan | ................... | H01Q 1/243 |
| 11,564,300 B2* | 1/2023 | Camden | ............... | H05B 47/155 |
| 11,743,996 B1* | 8/2023 | Udall | ................... | H05B 47/185 315/291 |
| 11,751,312 B2* | 9/2023 | Camden | ............... | H05B 47/105 315/291 |
| 11,797,044 B2* | 10/2023 | Murphy | .............. | H04W 56/002 |
| 11,808,873 B2* | 11/2023 | Wallin | .................. | G01S 5/0278 |
| 2003/0033394 A1* | 2/2003 | Stine | ....................... | H04L 47/24 709/222 |
| 2006/0124759 A1* | 6/2006 | Rossi | ....................... | F24F 11/47 236/51 |

(Continued)

OTHER PUBLICATIONS

U.S. Appl. No. 17/184,334, filed Feb. 24, 2021.

*Primary Examiner* — Hai V Nguyen (57) ABSTRACT

A system includes a group of transceiver nodes and diagnostic circuitry. A first transceiver node of the group broadcasts one or more beacons which a second transceiver node of the group attempts to receive. The second transceiver node provides a reception indication to the diagnostic circuitry. Based on the reception indication, the diagnostic circuitry determines a radio performance change for the first transceiver node and/or second transceiver node. Using a change threshold based on a distribution of radio performance changes for the group, the diagnostic circuitry may determine whether to generate a change indication for the first transceiver node and/or second transceiver node.

20 Claims, 5 Drawing Sheets

(56) References Cited

U.S. PATENT DOCUMENTS

| | | | |
|---|---|---|---|
| 2010/0029282 A1* | 2/2010 | Stamoulis | H04L 47/70 455/436 |
| 2010/0323628 A1* | 12/2010 | Shen | G01S 5/02521 455/67.11 |
| 2011/0320130 A1* | 12/2011 | Valdes | A61B 5/742 702/19 |
| 2012/0309394 A1* | 12/2012 | Radulescu | H04W 36/0058 455/436 |
| 2013/0322235 A1* | 12/2013 | Khoryaev | H04L 5/1469 370/229 |
| 2014/0293858 A1* | 10/2014 | Kalhan | H04W 52/0203 370/311 |
| 2015/0327210 A1* | 11/2015 | Radeluscu | H04W 36/302 455/456.1 |
| 2016/0044701 A1* | 2/2016 | Zhang | H04W 72/21 370/329 |
| 2017/0215228 A1* | 7/2017 | Radulescu | H04W 28/18 |
| 2017/0339519 A1* | 11/2017 | Buck, Jr. | G08B 25/08 |
| 2018/0288563 A1* | 10/2018 | Krzych | H04W 4/021 |
| 2019/0058570 A1* | 2/2019 | Zhang | H04W 72/56 |
| 2019/0239025 A1 | 8/2019 | Keal | |
| 2020/0359159 A1* | 11/2020 | Krzych | G01S 5/0294 |
| 2021/0183236 A1* | 6/2021 | Crafts | H05B 47/19 |
| 2021/0235216 A1* | 7/2021 | Krzych | H04W 4/021 |
| 2021/0239877 A1 | 8/2021 | Gao et al. | |
| 2021/0364298 A1 | 11/2021 | Gao | |
| 2022/0183128 A1* | 6/2022 | Camden | H05B 47/155 |
| 2022/0183133 A1* | 6/2022 | Camden | H04W 4/029 |
| 2022/0272490 A1* | 8/2022 | Mohan | H04W 4/029 |
| 2023/0067774 A1* | 3/2023 | Nishimoto | G01S 5/0221 |
| 2023/0099323 A1* | 3/2023 | Wada | H04B 17/345 370/329 |
| 2023/0118747 A1* | 4/2023 | Camden | H04L 12/2809 315/291 |
| 2023/0171810 A1* | 6/2023 | Belleschi | H04W 74/0833 370/329 |
| 2023/0189387 A1* | 6/2023 | Jeon | H04W 72/23 370/242 |
| 2023/0354494 A1* | 11/2023 | Camden | H04L 12/2809 |
| 2023/0375201 A1* | 11/2023 | Lie | F24F 11/72 |
| 2024/0021100 A1* | 1/2024 | Glaser | G09B 19/167 |
| 2024/0031107 A1* | 1/2024 | Goktepe | H04L 5/0053 |
| 2024/0069144 A1* | 2/2024 | Gao | G01S 5/02527 |
| 2024/0163998 A1* | 5/2024 | Baker | E06B 9/68 |

\* cited by examiner

RADIO FREQUENCY LOSS BASED SENSOR MANAGEMENT

TECHNICAL FIELD

This disclosure relates to sensor management.

BACKGROUND

Building management systems encompass a wide variety of equipment that aid in monitoring and controlling building operations. Building management systems often include one or more environmental control sub-systems, such as security, fire safety, lighting, heating, ventilation, and air conditioning ("HVAC") systems. The systems may also provide non-environmental control features for management and occupants of a building, such as indoor location tracking of assets (including occupants). Building management systems may use sensor data to support their operations.

Sensor management systems may include sensors positioned throughout a structure to detect building activity, such as occupancy detection and asset tracking. Unfortunately, these sensors might be installed improperly, recorded inaccurately, or otherwise fail to operate according to specifications. For example, a technician may install a sensor improperly, interchange the locations of two or more sensors, or mislabel a floor or ceiling plan intended to reflect sensor locations. Sensor performance may also change over time and deviate from condition at installation. Technologies that assist in the identification of incorrect positioning, installation, and/or operation will continue to drive adoption of sensor management systems including those used to support building management operations.

DETAILED DESCRIPTION

A sensor management system of a structure, such as a building, may have devices positioned throughout the structure. Each device may be assigned to a designated location of the structure and include a radio frequency (RF) transceiver node, which may operate as an RF sensor. The transceiver nodes may communicate with each other and measure radio signal path loss from one sensor to another. Expected RF signal values between sensors are determined based on known distances between the sensors or other methods of calculating predetermined RF signal values. Measured RF signal values between sensors are determined based on RF signals transmitted from one sensor to another. Radio signal path loss is determined by a sensor or upstream device based on the difference between the measured RF signal value and the expected RF signal value. When the measured RF signal value does not match the expected RF signal value, the corresponding sensor(s) may be marked as having undergone a radio performance change.

Radio signals suffer attenuation when they travel from a transmitter to a receiver in a somewhat unpredictable way, resulting in radio signal path loss. The path loss reduces the power density of an electromagnetic wave as it propagates through an environment. The path loss may occur as a result of traveling through free space, atmospheric conditions, and intermediate objects and reflecting from surrounding objects. For example, in free space, signals diminish in intensity as they propagate away from the transmitter. A structure such as a building environment, walls, furniture, equipment, people, and other obstructions may reflect or absorb, or both reflect and absorb, the radio signals. When a group of sensors is installed in a specific environment, the sensor management system will measure all the sensors' radio signal path losses and address any issues derived from these measurements.

The radio signal path loss is a random signal. Therefore, for some implementations, a statistical approach may be used to get a robust characteristic of the path loss that is not transient and reflects the structural and semi-permanent environmental factors. Instead of transmitting one signal, many signals are transmitted from a transceiver node in a session (for example, a burst transmission session). The detecting or receiving node may or may not detect or receive all the signals transmitted. However, a percentage of the transmitted signals may be captured. Suppose a statistically significant number of signals are captured from one transmission session. The individual detected or received signal values may be recorded, and the features such as the sum of the detected or received signal strength, squared sum, number of captured signals, etc., may be recorded as well. Other derivatives may be determined from these statistical features. The mean, median, mode, standard deviation, and distribution parameters of captured signals may be derived. These statistical features can then be compared with the expected statistical features to determine the sensor's condition. The expected features are determined by the structural and semi-permanent environmental factors, those deemed relevant to the accuracy, health, and operation of the transceiver node (whether the transceiver node is the receiving node or the transmitting node). In other words, the statistical features may be used to determine the radio performance and/or the change in radio performance for a transceiver.

In various contexts, some amount of radio performance change may be expected due to device aging, environmental changes, and/or other time-dependent factors. Thus, diagnosis systems that report any change (e.g., change from a previously measured or otherwise assigned previous performance level) in radio performance for a transceiver node of diagnosis group, may end up including reports for transceiver nodes unlikely to have undergone any unexpected change in radio performance (e.g., such as a substantial change in environment, an undue loss of transmission/reception capacity, an electrical power loss, a failure, or other unexpected change in performance).

To avoid over-reporting of radio performance changes one or more criteria for reporting may be applied. In some cases, a criterion based on absolute change may also lead to over and/or under-reporting. For example, broad-based environmental changes may affect all or a significant portion of nodes. For example, humidity in air is known to reduce radio propagation. Similarly, changes in the conductivity of obstructions may affect radio interference. Accordingly, a change in environmental humidity and/or the amount of water absorbed by ambient vegetation may have large scale effects on radio performance changes. For example, if a previous radio performance characterization occurred on a high humidity day and a current characterization occurs on a low-humidity-day-broad-based improvements may mask individual node degradation. Thus, absolute change based reporting may underreport degradation due to such masking. Conversely, over reporting may occur when environmental conditions cause broad-based radio signal degradation.

To avoid conditions where absolute change based reporting causes over or under reporting, criteria for reporting may be based (at least in part) on group-wide radio performance changes. For example, when determining when a particular transceiver in a group is to be reported based on that particular transceiver's radio performance change, the system may base the analysis on the radio performance changes of other transceivers from the group. Accordingly, the system may provide a technical improvement in that the system more accurately detects and reports radio performance changes warranting intervention and/or further investigation of performance issues.

Figure 1:
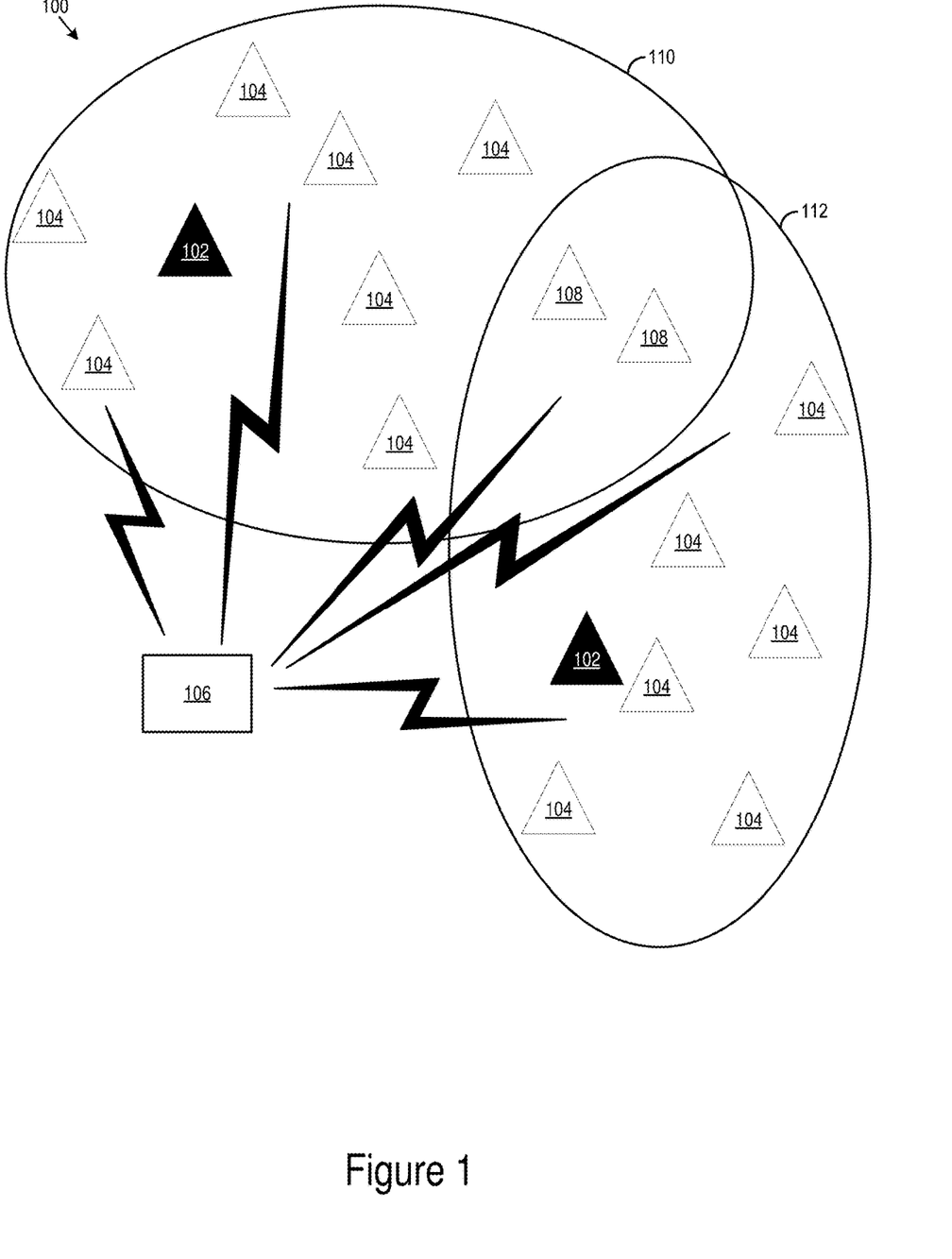
FIG. 1 shows an example sensor system including multiple transceiver nodes.

FIG. 1 shows an example sensor system 100 including multiple transceiver nodes 102, 104, 108. The multiple transceiver nodes 102, 104, 108 may each include an RF transceiver for broadcast and/or reception of RF signals. The sensor system 100 may further include diagnostic circuitry 106 which may coordinate RF signaling among the multiple transceiver nodes 102, 104, 108 to perform self-diagnostic evaluation of the radio performance status of the system 100. In some cases, the diagnostic circuitry 106 may be integrated with and/or share hardware with other coordination circuitry to control/coordinate other non-diagnostic functionality. The diagnostic circuitry 106 may be included or integrated with one or more of the transceiver nodes 102, 104, 108.

The diagnostic circuitry 106 may be localized to the coverage area of the sensor system 100 or partially/fully remote. The diagnostic circuitry 106 may operate on distributed hardware (such as cloud based systems and/or various other network based systems) or centralized hardware such a remote server or on-site computer system.

In various implementations, the multiple transceiver nodes 102, 104, 108 may include sensors for a real-time location system (RTLS), which may provide location for RF devices (such as RTLS-enabled ID badges, mobile devices, and/or other devices) within building or other structure and/or any zone covered by the multiple transceiver nodes 102, 104, 108 of the sensor system 100. The multiple transceiver nodes 102, 104, 108 may further include signal processing circuitry to support localized processing/analysis of signals (for example, physical layer signal processing in a multi-layer communications stack) and/or other signal processing.

The multiple transceiver nodes 102, 104, 108 may further include system circuitry (such as memory and/or processors) to coordinate operation of the transceiver nodes. The computational capacity of the system circuitry may vary across various implementations. For example, some implementations may use thin client and/or low-level processing capacity. For example, some implementation may use system circuitry within the multiple transceiver nodes 102, 104, 108 capable of supporting specific transmit and/or receive RF operations, but may offload various other processing tasks to other processing devices in the sensor system 100. In some implementations, the transceiver nodes 102, 104, 108 may include processing to support various tasks beyond physical signal processing, such as various user interface based applications. In some implementations, non-uniform transceiver nodes may be used. For example, a portion of the transceiver nodes 102, 104, 108 may include thin processing capabilities while other transceiver nodes 102, 104, 108 in the same system may include more expansive processing capabilities. In some cases, the transceiver nodes 102, 104, 108 may be organized such that local 'control' nodes may coordinate activities of a contingent of thin nodes.

Figure 2:
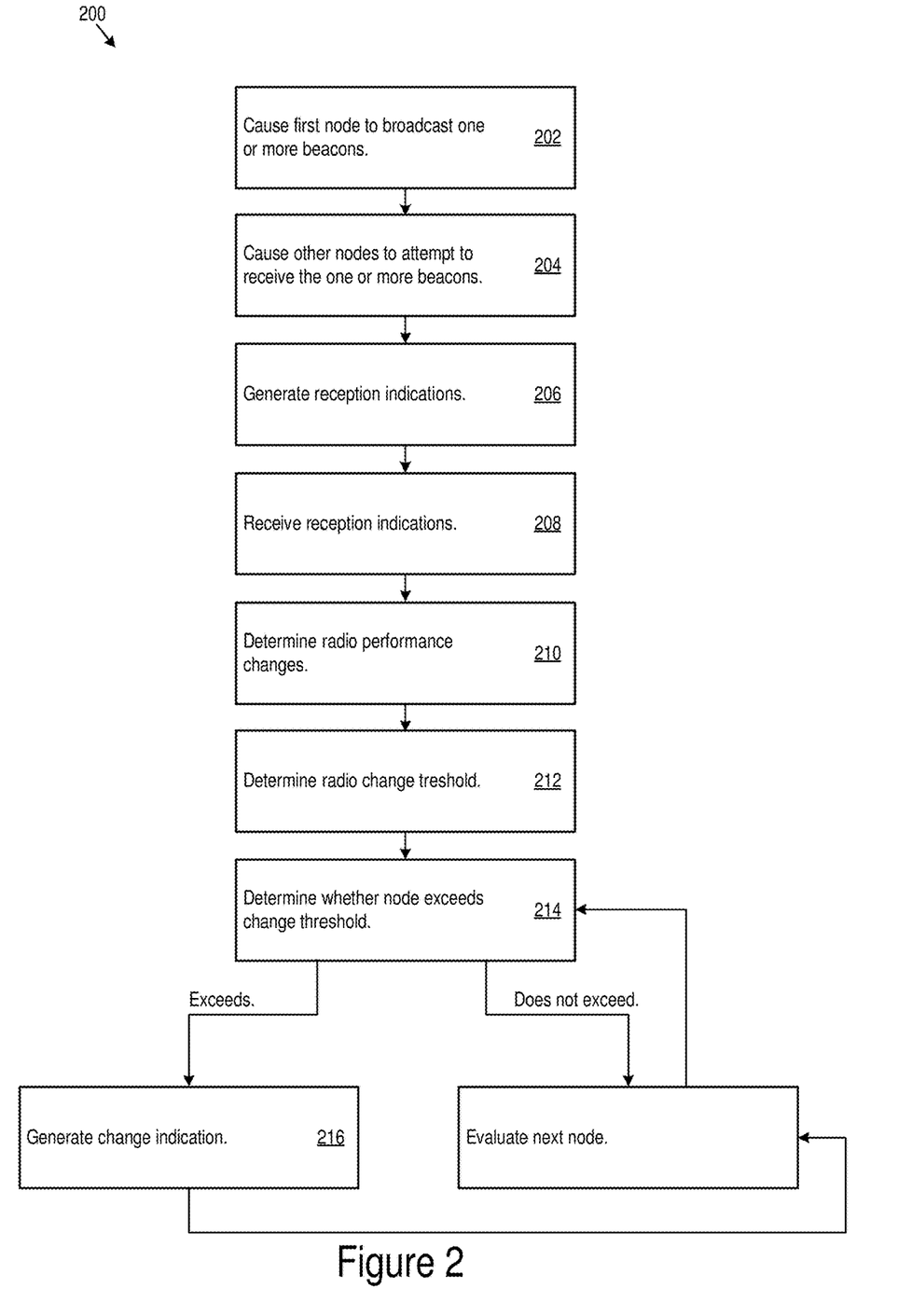
FIG. 2 shows example diagnostic logic.

Referring now to FIG. 2 while continuing to refer to FIG. 1, example diagnostic logic 200 is shown. The diagnostic logic 200 may be implemented using the diagnostic circuitry 106.

The diagnostic logic 200 may cause a first transceiver node 102 in each of the diagnostic groups 110, 112 to broadcast one or more beacons (202). The first node 102 is highlighted in black for clarity of presentation but may include a node with functionality the same or similar to that of other nodes 104, 108. As discussed below, each of the other nodes 104, 108 at different points in the diagnosis may serve as a beaconing node. In various implementations, the beacons may have one or more predetermined target properties. For example, the beacons may be transmitted at a specific target band, at predetermined target power level(s), in a sequence of a specific length, in a sequence with a predetermined target total power, in sequence with a predetermined target number of beacons, or with other predetermined target characteristics. In some cases, the one or more target properties of each individual beacon maybe the same as that of the other beacons in the sequence. Thus, in some cases, the beacons transmitted may be uniform in target power, target band, and/or other properties.

In some implementations, the beacons may have one or more random, pseudorandom, and/or otherwise non-deterministic target properties. The first transceiver node 102 may report (e.g., to the diagnostic logic 200) the target properties for comparison with the actually received beacons. Additionally or alternatively, beacon target property reporting may be used with systems with deterministic target properties. Reporting may be used to confirm that nodes are executing proper and/or expected operations during beaconing (e.g., whether or not the target properties are known or knowable by the diagnostic logic prior to reception of the report). In various contexts, reporting target properties may increase the bandwidth used by the nodes for reporting relative to systems that do not use such reports (e.g., systems that use predetermined target properties in lieu of reliance on target property reporting). In both cases, indications of the actual received beacon properties may be used. Accordingly, non-use of target property reports may allow for implementations with less overall bandwidth capability that those that use such reports. Systems that provide such reports may have increased data to support more complete analysis and may more quickly identify transmission-side radio performance issues due the presence of both transmission side and reception side reports.

In some implementations where beacon properties may change from beacon to beacon, reception indications may include increased data detail. For example, counts and power-sums of beacons may have reduced informational value where beacon properties change. Accordingly, such increased data detail may include additional received power level reports. For example, a receiving node 104, 108 may report individual beacon RSSIs in addition to or in lieu of summed power (or squared power) levels. In some cases, power levels for a selected subset of beacons in a series my be provided. For example, for beacons that change in a set progression (e.g., increasing/decreasing power by a set increment, or other progression) a sample (e.g., every X beacons, where X is an integer) may provide similar information to a report with detail on every beacon. In some cases, such sampling may be paired with summation information to provide information on all received beacons while also providing detail on a selected subset.

In some implementations, the first transceiver node 102 may broadcast a node identifier along with the beacons and/or embedded within the beacons to allow the other nodes 104, 108 to identify the first transceiver node 102 as the origin of the beacons. Additionally or alternatively, the diagnostic logic 200 may track which node 102 is broadcasting beacons and associate received reception indications (see below) according to timestamps or other time indicators within the reception indications. In some cases, a broadcast schedule may be distributed to the nodes. Using the schedule, nodes and/or the diagnosis logic 200 may determine the identity of the first node 102 that is currently broadcasting beacons.

In some cases, the condition of the transmitter of the first transceiver node 102 and/or the first transceiver node 102 as a whole may be unknown at the time of transmission. Accordingly, the first transceiver node 102 may attempt to broadcast the beacons with any target characteristics but actually transmit beacons with other characteristics and/or fail to transmit entirely. Therefore, a potential source of deviation from the expected characteristics of the received beacons (e.g., received at nodes 104, 108) may be the condition of the transmitter of the first transceiver node 102. In other words, when a receiving node 104, 108 receives a beacon and provides a corresponding report, the report may include information on the condition of the receiving node 104, 108 and the condition of the transmitting node 102.

Coordinated with the first transceiver node broadcast, the diagnostic logic 200 may cause other transceiver nodes 104, 108 in each of the diagnostic groups 110, 112 to attempt to receive the one or more beacons (204). In some cases, the diagnostic logic 200 may place the other transceiver nodes 104, 108 in a listening state to facilitate reception of the beacons. For example, the other nodes 104, 108 may cease transmissions while the first transceiver node broadcasts. This may, for example, reduce interference and/or mis-attributed received power (e.g., when other nodes are allowed to transmit, a receiving node may improperly attribute received power to the first broadcasting node).

In various implementations, the listening state may include tuning a radio antenna to a predetermined testing band and/or tuning to a sequence of bands predetermined intervals. In some cases, entering a listening state may include implementing diagnostic firmware and/or a diagnostic functionality of firmware on the various transceiver nodes. In some cases, for example in some cases where thin nodes are used, the transceiver nodes may include memory storage to support firmware capable of a limited number of functions. Accordingly, to execute the listen state and/or beacon broadcast, specific diagnostic firmware may be loaded onto the transceiver nodes 102, 104, 108 and then replaced with nominal operation firmware when the diagnosis procedure is complete.

The other nodes 104, 108 may generate reception indications based on the respective portions of the beacons they receive from the first transceiver node 102 (206). The reception indications may include various data regarding the characteristics (such as total power, sum of the squares individual received beacon powers, and/or other characteristics) and/or number of beacons received by each individual one of the other nodes 104, 108.

In some cases, the reported characteristics may use metrics or other signal characterization tools used for various other functionality of the transceiver nodes. For example, cellular-compliant, WIFI-compliant, RTLS-compliant, Bluetooth-compliant, and/or other radio communications standards may collect various signal parameters. As an example, a received signal strength indicator (RSSI) may be used in various ones of such standards. In some cases, the other nodes 104 may report a RSSI as a measure of received beacon power in the reception indications. In some cases, various sums or other functions of the RSSI may be reported. For example, a count of RSSIs generated during beacon reception may be reported as a count of the beacons received. For example, the sum of the RSSIs during beaconing may be reported as a total received power. For example, a sum of the squares of the RSSIs may be reported as a sum of squares of the powers of the beacons.

In various implementations, the reception indication may identify the node that generated the indication, the identity of the first node 102 that broadcast the beacons (if known by the receiving node), and/or the time (e.g., using timestamps and/or other time indicators) at which the beacons were received.

The number and characteristics of the received beacons at each of the other nodes 104, 108 may be affected by the actual characteristics of the beacons transmitted by the first node 102, the RF path from the first node 102 to that particular one other nodes, and the condition of that particular one other nodes. Thus, the reception indication may contain information on the transmitting node, the receiving node, and the path between those two particular nodes. The match and/or mismatch between the actual received power/number of beacons and the target properties of the transmitted beacons may be used to determine such information on transmitting node, the receiving node, and the path between those two particular nodes.

In various implementations, after the first node 102 completes the broadcast of the beacons, the first node 102 may shift to attempting beacon reception and one of the other nodes 104 may take over as the first transmitting node. The process may iterate until each node in the diagnostic group 110, 112 has completed a turn broadcasting beacons. Thus, although particular nodes are shown as the first transceiver nodes 102 for the purpose of illustration, each of the other nodes 104, 108 may have a turn acting as the first transceiver node 102. Only a sub-set of other nodes 104, 108 may be used as transceiver nodes 102 in other implementations.

The diagnostic groups 110, 112 may be selected based on node proximity, node transmission/reception range, RF path characteristics, and/or environmental characteristics. For example, a diagnostic group may include the transceiver nodes on a particular floor of a building, those in a particular room, and/or those of any designated portion of a structure or region. Additionally or alternatively, the diagnostic groups 110, 112 may be selected to control the length of the diagnostic process. In some cases, the diagnostic process may take longer with greater numbers of nodes. Accordingly, nodes may be divided into diagnostic groups (e.g., with no or minimal inter-group interference) for the purpose of shortening the amount of time used to perform the diagnostic. In some cases, nodes 108 may be included in multiple different diagnostic groups. Accordingly, different diagnostic groups may be overlapping or non-overlapping.

After generation of the reception indications, the other nodes 104, 108 may send (e.g., via RF network communications, backhaul network communications, and/or other network communications) the reception indications to the diagnostic circuitry 106 (208). In some cases, nodes may operate as data relays for other nodes. For example, some individual nodes may be installed without direct backhaul network access. For example, nodes may pass reporting data to other nodes via peer-to-peer wireless communications. Once the peer-to-peer wireless communications reach a node and/or other terminal with backhaul network access, the connected node may transfer the reporting information onto the backhaul network.

In some cases, a particular node 102, 104, 108 may be installed as a "relay" node. Relay nodes may be positioned within a system to support inter-node communications such as peer-to-peer wireless communications. In some cases, a relay node may be positioned in a location that is redundant for one or more operational purposes of the nodes. For example, the location may have RTLS, and/or other wireless service coverage from other close-by nodes. The relay node may provide capability to the node network by supporting communication to isolated nodes or areas rather than providing non-redundant support for other operational purposes of the nodes. Additionally or alternatively, nodes may be positioned to support wireless signal repetition and/or wireless transmission extension.

Using the reception indications, the diagnostic circuitry 106 may determine radio performance changes for the various transceiver nodes (210).

In various implementations, the radio performance changes may be determined relative to a previous and/or expected radio performance level. For example, at the time of installation of the transceiver nodes, a baseline diagnostic may be performed to determine a initial performance level. In an example, a radio performance simulation (e.g., based on an environment map or other data) may be performed to determine expected performance levels. In some cases, reference information such as look-up-tables with expected signal power loss and/or expected beacon count loss versus node-to-node distance may be used. Other previous or expect performance levels may be used as a reference.

The data from the reception indications may be used to determine current performance and that current performance may be compared to the previous and/or expected radio performance level.

In some cases, determining a radio performance level may include determining a score based on the reception indication data. For example, quantities such as total power received, number of beacons received, sum of squares of the individual beacon powers, and/or other quantities determined from the reception indications may be used to produce a score. A reception score for a node may be determined by combining (e.g., summing, averaging, weighted averaging, transmission-distance-weighted averaging, and/or otherwise combining) scores or quantities from each of the reception indications that the node produces. A transmission score for node may be determined by combining the reception indications from other nodes in the diagnostic group produced while the node in question was broadcasting its beacons.

In some implementations, a two-way radio performance score may be used to evaluate a beacon exchange between particular nodes. For example, the score may be relative an expected baseline reception level (e.g., based on node-to-node distance, previous node-to-node reception, node-to-node reception levels at installation, modelled node-to-node reception using building blueprint data, or other baseline). Two-way radio performance scores may be combined to generate an overall score for reception and/or transmission for a node. For example, combining the two-way radio scores for each instance a node behaved as the receiving node may generate an overall reception score for that node. Similarly, combining the two-way radio performance scores from the nodes that received beacons while a particular node was transmitting beacons may be used to generate an overall transmission score for that beacon.

Equation 1 shows an example two-way radio score, T:

$$T = ((1-\omega)^* |\mu_{err}|)/\sigma_{err} + (\omega^* SQ)/100 \qquad \text{Equation 1}$$

Where $\omega$ is a weighting factor, $\mu$ and $\sigma$ are the mean and sigma of the error, and SQ is the mean signal quality factor. T is in the range of [0 1]. SQ may be obtained by combining RSSIs and/or other signal quality indicators. $\mu$ and $\sigma$ may be obtained by comparing the number and/or power level of beacons received and determining an error value relative to the selected baseline value from which the radio performance change is being determined. $\omega$ may be selected to balance between absolute radio performance and radio performance change in the formulation of the score. In the example, increasing $\omega$ puts more weight on absolute performance, while decreasing $\omega$ puts more weight on change relative to the baseline. In an example, $\omega$ may be set at 0.2 such that 80% of the score comes from change relative to baseline, while 20% of the score comes from absolute performance.

As an illustrative example, the T score may be used to determine an effective node-to-node distance between beaconing node and receiving node. The effective node-to-node distance may be compared to the node-to-node distance marked on a floorplan or other installation blueprint. The distance error may provide an indication of the radio performance loss. Such distance errors may be combined (e.g., averaged, weighted average, and/or otherwise combined) to provide a reception and/or transmission distance error for a single node. For example, each corresponding T score from each receiving node for one node's beaconing session may be combined to provide a transmission score for the beaconing node. For example, each corresponding T score from each time a receiving node attempted to receive beacons from another transmitting node may be combined to produce a reception score for that receiving node.

The current scores may be compared to previous and/or expected scores to determine a radio performance change. In some cases, raw data (e.g., from the reception indications) may compared to and/or subtracted from previous and/or expected raw data to get change data. Then the change data may be combined into a score.

The diagnostic logic 200 may determine a distribution of radio performance changes for the diagnostic group to, in turn, determine a radio change threshold for the group (212). The diagnostic logic 200 may determine which of the transceiver nodes underwent radio performance changes exceeding the threshold (214). Transceiver nodes with radio performance changes exceeding the threshold may be reported (e.g., via generation of a change indication) by the diagnostic logic 200 (216). Transceiver nodes with radio performance changes that do not exceed the threshold may be considered to have had changes within the nominal portion of the distribution of radio performance changes.

In various implementations, the distribution of radio performance changes may be characterized using various schemes for quantifying relative values of a common parameter among members of a group. For example, various statistical distributions may be mapped to the radio performance change data to characterize the radio performance changes. For example, a regression (e.g., a polynomial regression, a Gaussian regression, and/or other regression) may be fit to data points representing the radio performance changes of the diagnostic groups 110, 112. In an example, the radio performance changes may be plotted in a histogram. In an example, the radio performance changes may be ordered in accord with the relative magnitude of changes for the different nodes 102, 104, 108 of the diagnostic groups 110, 112. In some cases, the ordering may be done without regard for the direction of the radio performance change (e.g., without regard for whether the change includes an improvement or degradation of performance). In some cases, the ordering may account for the direction of the radio performance change.

The threshold may be set based on one or more characteristics of the distribution to determine outlier nodes. Thus, general change trends affecting the diagnostic group as a whole may be averaged out and node-specific changes may be identified. For example, the threshold may include nodes with radio performance change magnitudes in a predetermined top percentile (decile, quartile, or other percentiles) for the diagnostic group. In some cases, threshold may include a specific number of nodes with the largest changes. In various implementations, the threshold may include various statistical measures such as: nodes exceeding a predetermined number of standard deviations from a median value change: nodes with performance change magnitudes exceeding twice (or other predetermined multiplicative or absolute factor) that of the median change magnitude for the diagnostic group.

In some cases, the change indication may include a message or an alert including identifiers for the nodes with threshold-exceeding radio performance changes. The message/alert may be transmitted to a user account for display via a messaging or alert system for a user responsible for maintenance of the nodes. In some cases, the change indication may include a command for display of the identifiers for the threshold-exceeding nodes on a terminal. The indicator may have different formats in different implementations. In various implementations, the format of the change indication may be selected to inform a user responsible for maintenance of which nodes may require maintenance and/or further performance diagnosis.

Figure 3:
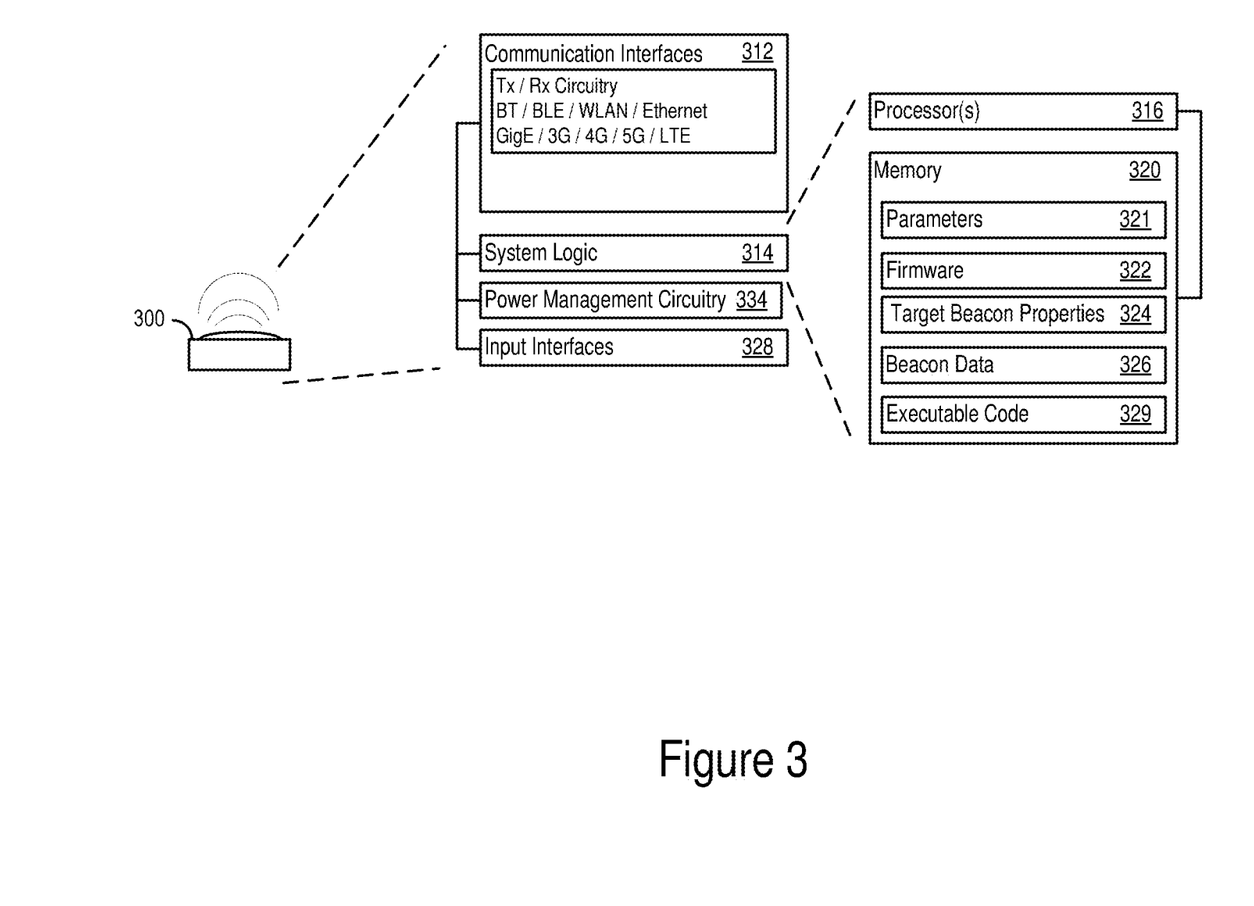
FIG. 3 shows an example transceiver node.

FIG. 3 shows an example transceiver node 300. The transceiver node 300 may include system logic 314 to support functional tasks such as provisional of RTLS services, RF sensor application services, node-to-node communications, node-to-controller communications, firmware management and installation, and/or other functional tasks. The system logic 314 may further support beacon generation and/or beacon reception during diagnostic operation. The system logic 314 may include processors 316, memory 320, and/or other circuitry.

The memory 320 may be used to store firmware 322, target beacon properties 324, and/or received beacon data 326 used in execution of diagnostic operations. The memory 320 may further store parameters 321, such as node identifiers, function parameters (such as parameters used in RTLS operation), and/or other data used to support operation of the transceiver node 300). The memory may further store executable code 329, which may support nominal operation, such as RTLS operation, and/or diagnostic operation.

The transceiver node 300 may also include one or more communication interfaces 312, which may support wireless, e.g. Bluetooth, Bluetooth Low Energy, Wi-Fi, WLAN, cellular (3G, 4G, 5G, LTE/A), RTLS signaling, and/or wired, ethernet, Gigabit ethernet, optical networking protocols. Additionally, or alternatively, the communication interface 312 may beacon transmission/reception to support diagnostic operation. The transceiver node 300 may include power management circuitry 334 and one or more input interfaces 328.

Figure 4:
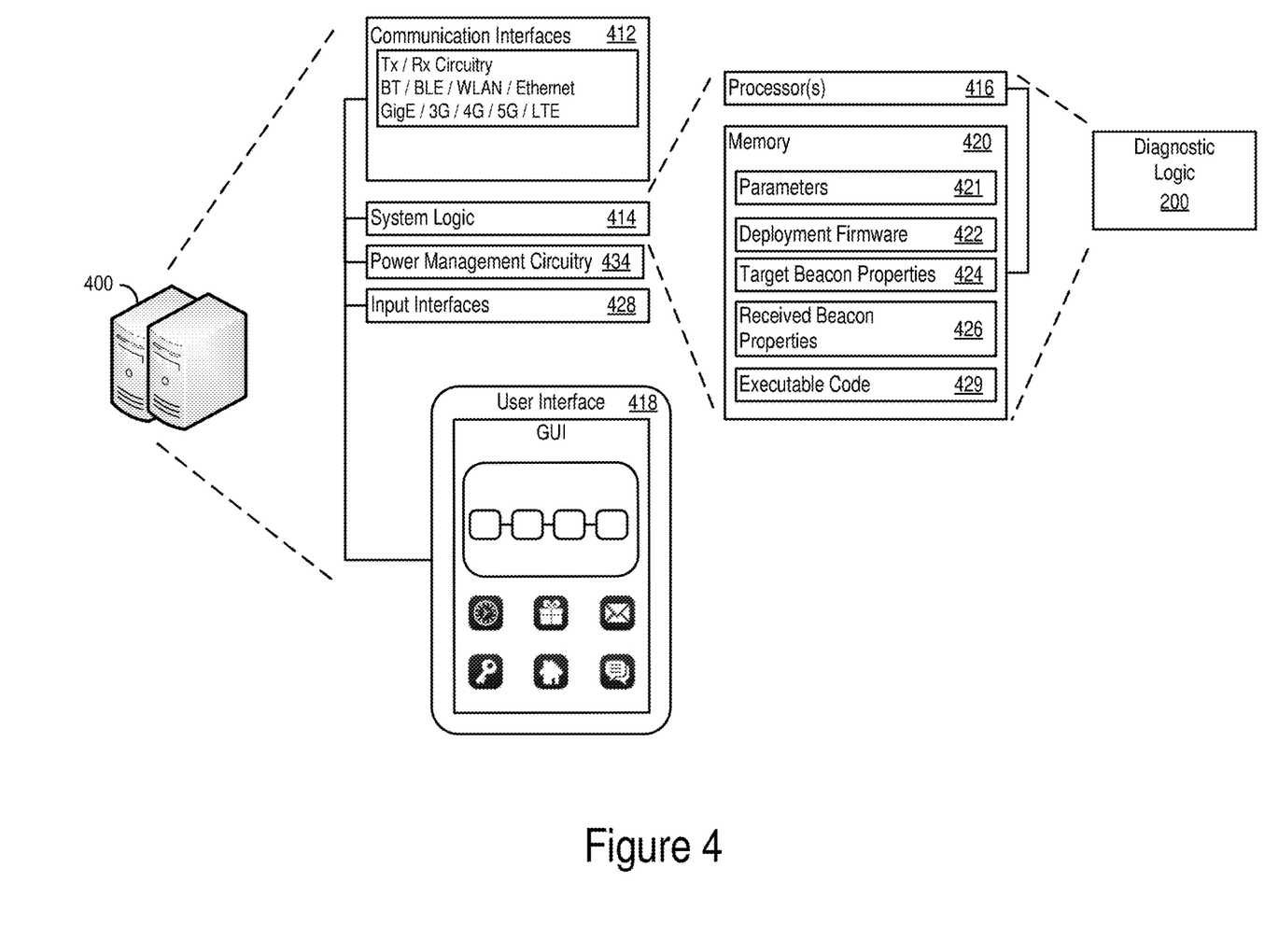
FIG. 4 shows an example diagnostic execution environment.

FIG. 4 shows an example diagnostic execution environment (DEE) 400, which, for example, may operate as diagnostic circuitry 106. The DEE 400 may include system logic 414 to support coordination of beaconing and listening by the transceiver nodes 102, 104, 108. The system logic 414 may include processors 416, memory 420, and/or other circuitry, which may be used to analyze reception indications, determine radio performance changes, determine radio performance distributions among diagnostic groups, determine change thresholds, identify nodes exceeding change thresholds, and/or report change indications.

The memory 420 may be used to store: firmware for deployment to the transceiver nodes 422, target beacon properties 424, and/or received beacon data 426 used in execution of diagnostic operations. The memory 420 may further store parameters 421, such as node identifiers, timings for diagnostic operations, and/or other coordination parameters. The memory may further store executable code 429, which may support diagnostic operation and/or other maintenance functions.

The DEE 400 may also include one or more communication interfaces 412, which may support wireless, e.g. Bluetooth, Bluetooth Low Energy, Wi-Fi, WLAN, cellular (3G, 4G, 5G, LTE/A), and/or wired, ethernet, Gigabit ethernet, optical networking protocols. The DEE 400 may include power management circuitry 434 and one or more input interfaces 428.

The DEE 400 may also include a user interface 418 that may include man-machine interfaces and/or graphical user interfaces (GUI). The GUI may be used to present options for sensor maintenance, diagnostic operations, and/or other sensor management operations.

Consistent with discussion of the diagnostic circuitry 106 above, the DEE 400 may be implemented as a localized system, in some implementations. In some implementations, the DEE 400 may be implemented as a distributed system. For example, the DEE 400 may be deployed in a cloud computing environment. In some cases, the DEE 400 may be implemented (at least in part) on hardware integrated (and/or co-located) with the example transceiver node 300. Accordingly, in various implementations, functions of the diagnostic logic 200 may be performed by hardware on the transceiver nodes 102, 104, 108 themselves (e.g., in localized at a single node or distributed over multiple nodes).

Figure 5:
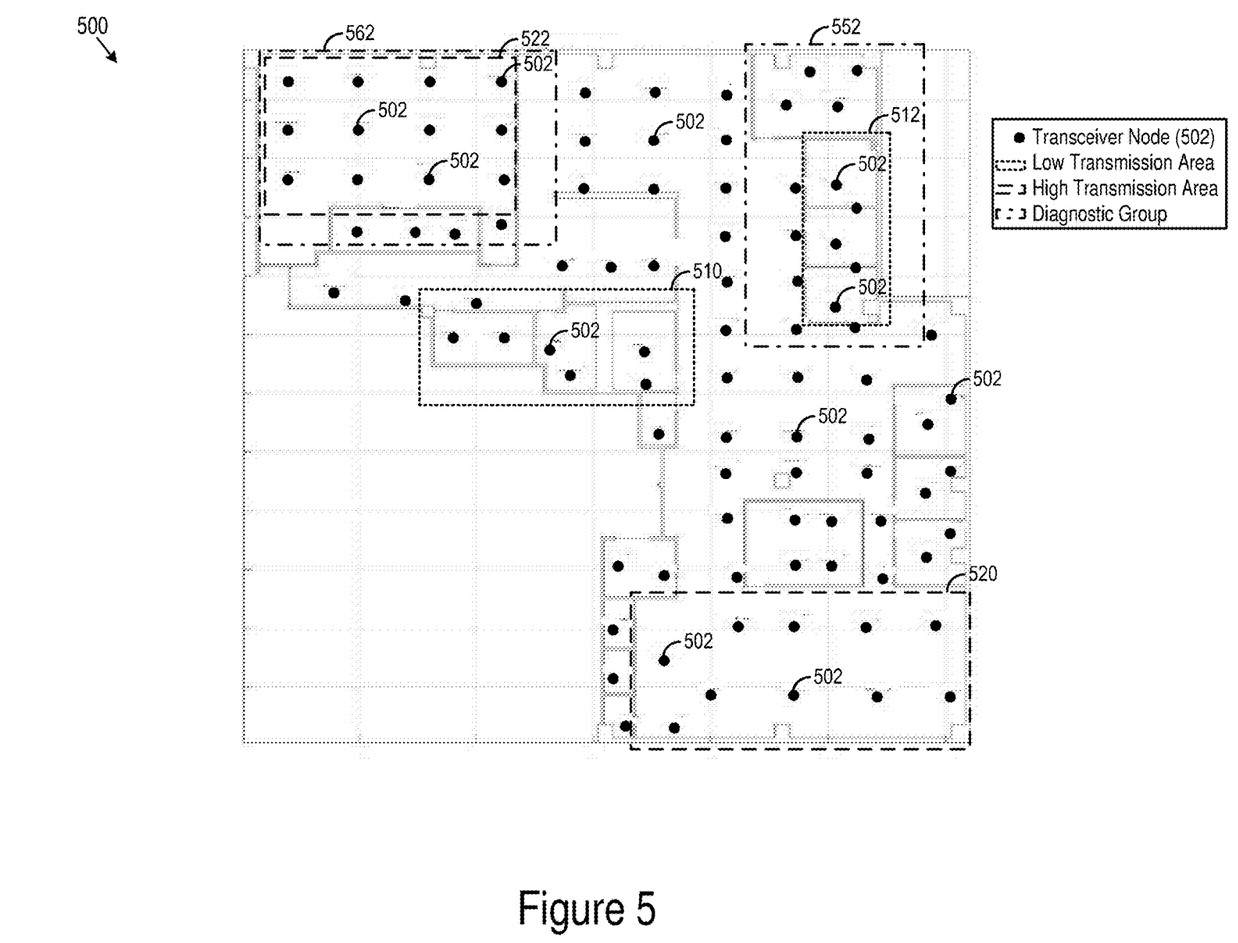
FIG. 5 shows an example sensor floorplan.

FIG. 5 shows an example sensor floor plan 500 with example transceiver node locations 502. The RF paths created by the floor plan creates areas of low node-to-node reception, such as the example bathroom area 510 and the example meeting room area 512. The RF paths created by the floor plan creates areas of high node-to-node reception, such as the example atrium area 520 and the example lecture hall 522.

In an illustrative scenario, the nodes 502 in the meeting room area 512 are part of a first diagnostic group 552. The nodes 502 in the lecture hall 532 are part of a second diagnostic group 562. Because of the low node-to-node reception for the nodes 502 in the meeting room area 512, the radio change thresholds for the first diagnostic group 552 may differ from those of the second diagnostic group 562. For example, because node-to-node reception may be intermittent for the first diagnostic group, a change to a 100% beacon loss level (e.g., no other nodes receive beacons from a given node in the group during the diagnostic process) may not necessarily result in an above threshold change. However, such a change for a node in the second diagnostic group may be indicative of transmitter damage, an environmental change (such as a new wall) that obstructs beacon transmission, and/or other significant change in node conditions. Because the 100% beacon loss level was within a nominal portion of the distribution of radio performance changes for the first diagnostic group, no radio change indicator may be generated. Conversely, a change to a 100% loss level for beacons in the second diagnostic group 562 is outside the nominal.

The inverse scenario may also be illustrative. For a change to a 100% reception level for beacons from a given node at a second node in the first diagnostic group 552, a radio change indicator may be generated. Such a change may be above threshold because at least some amount of loss may be expected due to the numerous walls in the meeting room area 512. Thus, a large positive change in reception may indicate the removal or breech of a wall, a node relocation, or other change that improves node-to-node reception. However, in the lecture hall 532, node-to-node reception may be high. Thus, a change to a 100% reception level for beacons may be within the nominal portion of the distribution—resulting in no radio change indicator being generated.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be embodied as a signal and/or data stream and/or may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may particularly include a storage medium and instructions stored in or on the medium, and the instructions when executed by the circuitry in a device may cause the device to implement any of the processing described above or illustrated in the drawings.

The implementations may be distributed as circuitry, e.g., hardware, and/or a combination of hardware and software among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

Table 1 includes various examples.

TABLE 1

| Examples |
|---|
| 1. A system including:<br>a first transceiver node configured to broadcast one or more beacons;<br>a second transceiver node configured to:<br>    attempt to receive the one or more beacons; and<br>    generate a reception indication of a received portion of the one or more beacons;<br>diagnostic circuitry, in data communication with the first and second transceiver nodes, the diagnostic circuitry configured to:<br>based at least in part on the reception indication from the second transceiver node, determine a radio performance change for the first and second transceiver nodes;<br>based on a distribution of radio performance changes for a group of transceiver nodes including the first and second transceiver nodes, determine a radio change threshold; and<br>at a time when the first transceiver node and/or the second transceiver node exceed the radio change threshold, generate a change indication including the first transceiver node and/or the second transceiver node, where:<br>optionally, the system is in accord with any other example in this table. |
| 2. The system of example 1 or any other example in this table, where each of the one or more beacons has a corresponding predetermined target transmission power. |
| 3. The system of example 2 or any other example in this table, where the corresponding predetermined target transmission power is identical for each of the one or more beacons. |
| 4. The system of example 2 or any other example in this table, where the radio performance change for the first transceiver node is based at least in part on whether an actual transmission power of each of the one or more beacons matches the corresponding predetermined target transmission power for each of the one or more beacons. |

TABLE 1-continued

Examples

5. The system of example 2 or any other example in this table, where the radio performance changes for the first and second transceiver nodes are based at least in part on a magnitude by which a received transmission power of each of the one or more beacons deviates from the corresponding predetermined target transmission power for each of the one or more beacons.
6. The system of example 1 or any other example in this table, where the second transceiver node is configured to attempt to receive the one or more beacons by entering a listening state.
7. The system of example 1 or any other example in this table, where the diagnostic circuitry is configured determine the radio performance changes relative to a previous radio performance assessment in which the first transceiver node transmitted one or more other beacons for reception by the second transceiver node.
8. The system of example 7 or any other example in this table, where the previous radio performance assessment includes a baseline radio performance assessment associated with an installation of the first transceiver node and/or the second transceiver node.
9. The system of example 1 or any other example in this table, where the first transceiver node is configured to broadcast the one or more beacons by broadcasting a predetermined number of beacons.
10. The system of example 9 or any other example in this table, where the radio performance changes for the first and/or second transceiver nodes are based at least in part on a comparison between a received number of beacons by the second transceiver node and the predetermined number of beacons.
11. The system of example 1 or any other example in this table, where the diagnostic circuitry is configured to determine the radio change threshold by:
    mapping the radio performance changes to a statistical model;
    based on the mapping, determining a criterion for an outlier transceiver node from the group of transceiver nodes; and
    setting the radio change threshold in accord with the criterion.
12. The system of example 11 or any other example in this table, where the criterion includes:
    having magnitude of radio performance change by a predetermined number of standard deviations;
    having membership in a predetermined number of transceiver nodes with greatest magnitude of radio performance change; and/or
    having membership in a percentile of transceiver nodes with greatest magnitude of radio performance change.
13. The system of example 11 or any other example in this table, where mapping the radio performance changes to the statistical model includes:
    applying a regression to the radio performance changes;
    generating a histogram using the radio performance changes; and/or
    ordering the radio performance changes based on a relative magnitude of radio performance changes.
14. The system of example 1 or any other example in this table, where the diagnostic circuitry is configured to determine the radio performance change for the first and second transceiver nodes by assigning a performance score based on:
    a sum of received signal strength indicators (RSSIs) generated at the second transceiver node based on the one or more beacons;
    a sum of squares of the RSSIs generated at the second transceiver node based on the one or more beacons; and/or
    a count of the RSSIs generated at the second transceiver node based on the one or more beacons.
15. A method including:
broadcasting, from a first transceiver node, one or more beacons;
at a second transceiver node:
    attempting to receive the one or more beacons; and
    generating a reception indication of a received portion of the one or more beacons;
at diagnostic circuitry, in data communication with the first and second transceiver nodes:
based at least in part on the reception indication from the second transceiver node, determining a radio performance change for the first and second transceiver nodes;
based on a distribution of radio performance changes for a group of transceiver nodes including the first and second transceiver nodes, determining a radio change threshold; and
at a time when the first transceiver node and/or the second transceiver node exceed the radio change threshold, generating a change indication including the first transceiver node and/or the second transceiver node, where:
optionally, the method is in accord with any other example in this table.

TABLE 1-continued

Examples

16. The method of example 15 or any other example in this table, where determining the radio change threshold includes:
   mapping the radio performance changes to a statistical model;
   based on the mapping, determining a criterion for an outlier transceiver node from the group of transceiver nodes; and
   setting the radio change threshold in accord with the criterion.
17. The method of example 16 or any other example in this table, where the criterion includes:
   having magnitude of radio performance change by a predetermined number of standard deviations;
   having membership in a predetermined number of transceiver nodes with greatest magnitude of radio performance change; and/or
   having membership in a percentile of transceiver nodes with greatest magnitude of radio performance change.
18. The method of example 16 or any other example in this table, where mapping the radio performance changes to the statistical model includes:
   applying a regression to the radio performance changes;
   generating a histogram using the radio performance changes; and/or
   ordering the radio performance changes based on a relative magnitude of radio performance changes.
19. A system including:
multiple transceiver nodes, the multiple transceiver nodes fixed at known positions;
diagnostic circuitry, in data communication with the multiple transceiver nodes, the diagnostic circuitry configured to:
cause the multiple transceiver nodes to initiate a coordinated radio performance diagnostic, the coordinated radio performance diagnostic, by:
   causing a first node of the multiple transceiver nodes to broadcast a predetermined number of beacons;
   while the first node broadcasts, placing others of the multiple transceiver nodes in a listening state;
   causing each of the other nodes to generate a reception indication of a received portion of the predetermined number of beacons while in the listening state;
based at least in part on the reception indications, determine a radio performance change for each of the multiple transceiver nodes;
based on a distribution of the radio performance changes, determine a radio change threshold for the multiple transceiver nodes; and
generate a change indication for each of the other nodes with a corresponding performance change that exceeds the radio change threshold, where:
optionally, the system is in accord with any other example in this table.
20. The system of example 19 or any other example in this table, where the listening state includes an operation mode including a cessation of radio transmission.
21. A system including:
one or more sensors; and
circuitry configured to implement any feature or any combination of features described in this table or disclosure.
22. A method including implementing any feature or any combination of features described in this table or disclosure.
23. A method including installing the system of any example in this table.
24. A product including:
machine-readable media; and
instructions stored on the machine-readable media, the instructions configured to cause a processor to perform (at least in part) the method of any example in this table, where:
optionally, the machine-readable media is non-transitory;
optionally, the machine-readable media is other than a transitory signal; and
optionally, the instructions are executable.

Headings and/or subheadings used herein are intended only to aid the reader with understanding described implementations. The invention is defined by the claims.

What is claimed is:

1. A system including:
a first transceiver node configured to broadcast one or more beacons;
a second transceiver node configured to:
   attempt to receive the one or more beacons; and
   generate a reception indication of a received portion of the one or more beacons;
diagnostic circuitry, in data communication with the first and second transceiver nodes, the diagnostic circuitry configured to:
   based at least in part on the reception indication from the second transceiver node, determine a radio performance change for the first and second transceiver nodes;
   based on a distribution of radio performance changes for a group of transceiver nodes including the first and second transceiver nodes, determine a radio change threshold; and
   at a time when the first transceiver node and/or the second transceiver node exceed the radio change threshold, generate a change indication including the first transceiver node and/or the second transceiver node.

2. The system of claim 1, where each of the one or more beacons has a corresponding predetermined target transmission power.

3. The system of claim 2, where the corresponding predetermined target transmission power is identical for each of the one or more beacons.

4. The system of claim 2, where the radio performance change for the first transceiver node is based at least in part on whether an actual transmission power of each of the one or more beacons matches the corresponding predetermined target transmission power for each of the one or more beacons.

5. The system of claim 2, where the radio performance changes for the first and second transceiver nodes are based at least in part on a magnitude by which a received transmission power of each of the one or more beacons deviates from the corresponding predetermined target transmission power for each of the one or more beacons.

6. The system of claim 1, where the second transceiver node is configured to attempt to receive the one or more beacons by entering a listening state.

7. The system of claim 1, where the diagnostic circuitry is configured determine the radio performance changes relative to a previous radio performance assessment in which the first transceiver node transmitted one or more other beacons for reception by the second transceiver node.

8. The system of claim 7, where the previous radio performance assessment includes a baseline radio performance assessment associated with an installation of the first transceiver node and/or the second transceiver node.

9. The system of claim 1, where the first transceiver node is configured to broadcast the one or more beacons by broadcasting a predetermined number of beacons.

10. The system of claim 9, where the radio performance changes for the first and/or second transceiver nodes are based at least in part on a comparison between a received number of beacons by the second transceiver node and the predetermined number of beacons.

11. The system of claim 1, where the diagnostic circuitry is configured to determine the radio change threshold by:
mapping the radio performance changes to a statistical model;
based on the mapping, determining a criterion for an outlier transceiver node from the group of transceiver nodes; and
setting the radio change threshold in accord with the criterion.

12. The system of claim 11, where the criterion includes:
having magnitude of radio performance change by a predetermined number of standard deviations;
having membership in a predetermined number of transceiver nodes with greatest magnitude of radio performance change; and/or
having membership in a percentile of transceiver nodes with greatest magnitude of radio performance change.

13. The system of claim 11, where mapping the radio performance changes to the statistical model includes:
applying a regression to the radio performance changes;
generating a histogram using the radio performance changes; and/or
ordering the radio performance changes based on a relative magnitude of radio performance changes.

14. The system of claim 1, where the diagnostic circuitry is configured to determine the radio performance change for the first and second transceiver nodes by assigning a performance score based on:

a sum of received signal strength indicators (RSSIs) generated at the second transceiver node based on the one or more beacons;
a sum of squares of the RSSIs generated at the second transceiver node based on the one or more beacons; and/or
a count of the RSSIs generated at the second transceiver node based on the one or more beacons.

15. A method including:
broadcasting, from a first transceiver node, one or more beacons;
at a second transceiver node:
attempting to receive the one or more beacons; and
generating a reception indication of a received portion of the one or more beacons;
at diagnostic circuitry, in data communication with the first and second transceiver nodes:
based at least in part on the reception indication from the second transceiver node, determining a radio performance change for the first and second transceiver nodes;
based on a distribution of radio performance changes for a group of transceiver nodes including the first and second transceiver nodes, determining a radio change threshold; and
at a time when the first transceiver node and/or the second transceiver node exceed the radio change threshold, generating a change indication including the first transceiver node and/or the second transceiver node.

16. The method of claim 15, where determining the radio change threshold includes:
mapping the radio performance changes to a statistical model;
based on the mapping, determining a criterion for an outlier transceiver node from the group of transceiver nodes; and
setting the radio change threshold in accord with the criterion.

17. The method of claim 16, where the criterion includes:
having magnitude of radio performance change by a predetermined number of standard deviations;
having membership in a predetermined number of transceiver nodes with greatest magnitude of radio performance change; and/or
having membership in a percentile of transceiver nodes with greatest magnitude of radio performance change.

18. The method of claim 16, where mapping the radio performance changes to the statistical model includes:
applying a regression to the radio performance changes;
generating a histogram using the radio performance changes; and/or
ordering the radio performance changes based on a relative magnitude of radio performance changes.

19. A system including:
multiple transceiver nodes, the multiple transceiver nodes fixed at known positions;
diagnostic circuitry, in data communication with the multiple transceiver nodes, the diagnostic circuitry configured to:
cause the multiple transceiver nodes to initiate a coordinated radio performance diagnostic, the coordinated radio performance diagnostic, by:
causing a first node of the multiple transceiver nodes to broadcast a predetermined number of beacons;
while the first node broadcasts, placing others of the multiple transceiver nodes in a listening state;

causing each of the other nodes to generate a reception indication of a received portion of the predetermined number of beacons while in the listening state;

based at least in part on the reception indications, determine a radio performance change for each of the multiple transceiver nodes;

based on a distribution of the radio performance changes, determine a radio change threshold for the multiple transceiver nodes; and generate a change indication for each of the other nodes with a corresponding performance change that exceeds the radio change threshold.

20. The system of claim 19, where the listening state includes an operation mode including a cessation of radio transmission.

* * * * *